United States Patent
Armstrong

(10) Patent No.: US 8,797,580 B2
(45) Date of Patent: Aug. 5, 2014

(54) SYSTEMS AND METHODS FOR ENTERPRISE SHARING OF A PRINTING DEVICE THAT IS CONFIGURED TO COMMUNICATE WITH A DISTRIBUTED PRINTING SERVICE

(75) Inventor: Charles Thomas Armstrong, Rancho Santa Margarita, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 133 days.

(21) Appl. No.: 13/402,749

(22) Filed: Feb. 22, 2012

(65) Prior Publication Data
US 2013/0215455 A1 Aug. 22, 2013

(51) Int. Cl.
*G06F 3/12* (2006.01)
*G06K 15/00* (2006.01)

(52) U.S. Cl.
USPC .......................................... 358/1.15; 358/1.14

(58) Field of Classification Search
USPC .......... 358/1.1, 1.9, 1.14, 1.15, 402; 709/201, 709/203, 219; 382/100, 112, 115
See application file for complete search history.

(56) References Cited

U.S. PATENT DOCUMENTS

| | | | |
|---|---|---|---|
| 6,601,102 B2 * | 7/2003 | Eldridge et al. | 709/229 |
| 7,711,648 B2 * | 5/2010 | Howard et al. | 705/59 |
| 2008/0060061 A1 | 3/2008 | Deshpande et al. | |
| 2008/0244712 A1 | 10/2008 | Kitada et al. | |
| 2010/0146611 A1 | 6/2010 | Kuzin et al. | |
| 2011/0090529 A1 | 4/2011 | Hertling | |
| 2011/0176162 A1 | 7/2011 | Kamath et al. | |
| 2011/0235085 A1 | 9/2011 | Jazayeri et al. | |
| 2013/0027741 A1 * | 1/2013 | Liu | 358/1.15 |
| 2013/0085968 A1 * | 4/2013 | Schultz et al. | 705/400 |

OTHER PUBLICATIONS

Lexmark Mobile Print Solutions for Enterprise, downloaded Feb. 2012.
Lexmark Mobile Printing White Paper, downloaded Feb. 2012.
Lexmark Google Cloud Print ESF App, downloaded Feb. 2012.

* cited by examiner

*Primary Examiner* — Gabriel Garcia
(74) *Attorney, Agent, or Firm* — Canon U.S.A., Inc. IP Division

(57) ABSTRACT

Systems, methods, and devices for registering a printing device receive a selection of a printing device available on an enterprise, wherein the selection includes a printing device identifier associated with the printing device, receive a credential issued by an enterprise device, wherein the enterprise device is associated with the enterprise, receive a refresh token from the printing device, receive a printing service user identifier, send the refresh token to the printing service, receive an access token from the printing service, and send the access token, the printing device identifier, a share request, and the printing service user identifier to the printing service.

15 Claims, 12 Drawing Sheets

US 8,797,580 B2

SYSTEMS AND METHODS FOR ENTERPRISE SHARING OF A PRINTING DEVICE THAT IS CONFIGURED TO COMMUNICATE WITH A DISTRIBUTED PRINTING SERVICE

BACKGROUND

1. Field

The present disclosure relates to systems and methods for sharing a printing device in an enterprise environment.

2. Background

Some printing devices are capable of communicating with a distributed printing service (e.g., a cloud printing service) without the use of a proxy. These printing devices may be capable of self-registration with a distributed printing service, and may receive print jobs from the distributed printing service without the use of a proxy (e.g., a computing device that operates a driver for the printing device and that mediates communication between the printing device and the distributed printing service).

SUMMARY

In one embodiment, a method for registering a printing device comprises receiving a selection of a printing device available on an enterprise, wherein the selection includes a printing device identifier associated with the printing device, receiving a credential issued by an enterprise device, wherein the enterprise device is associated with the enterprise, receiving a refresh token from the printing device, receiving a printing service user identifier, sending the refresh token to the printing service, receiving an access token from the printing service, and sending the access token, the printing device identifier, a share request, and the printing service user identifier to the printing service.

In one embodiment, one or more computer-readable media store instructions that, when executed by one or more computing devices, cause the one or more computer devices to perform operations comprising receiving, from a user computing device, a selection of a printing device available on an enterprise, wherein the selection includes a printing device identifier associated with the printing device, receiving, from an enterprise device, a credential issued by an enterprise device associated with the enterprise, receiving a first credential from the printing device, receiving a printing service user identifier, sending the first credential to the printing service, receiving an second credential from the printing service, and sending the second credential, the printing device identifier, and the printing service user identifier to the printing service.

In one embodiment, a system for registering a printing device comprises an enterprise device associated with an enterprise, wherein the enterprise device is configured to receive an enterprise user identifier and a credential associated with the enterprise user identifier, generate an enterprise credential, and transmit the enterprise credential to a user computing device. The system further comprises a registration device configured to receive a printing service user identifier, receive a printing device identifier for a printing device associated with the enterprise, receive a first credential from the printing device, receive the enterprise credential and, in response, send the first credential to the printing service, receive a second credential from the printing service, and transmit the second credential, the printing device identifier, and the printing service user identifier to the printing service.

This brief summary has been provided so that the nature of this disclosure may be understood quickly. A more complete understanding can be obtained by reference to the following detailed description and to the attached drawings.

DESCRIPTION

Though the following description includes certain explanatory embodiments, alternatives, equivalents, and modifications are included within the scope of the claims. Additionally, the explanatory embodiments may include several novel features, and a particular feature may not be essential to practice the systems and methods described herein.

Figure 1:
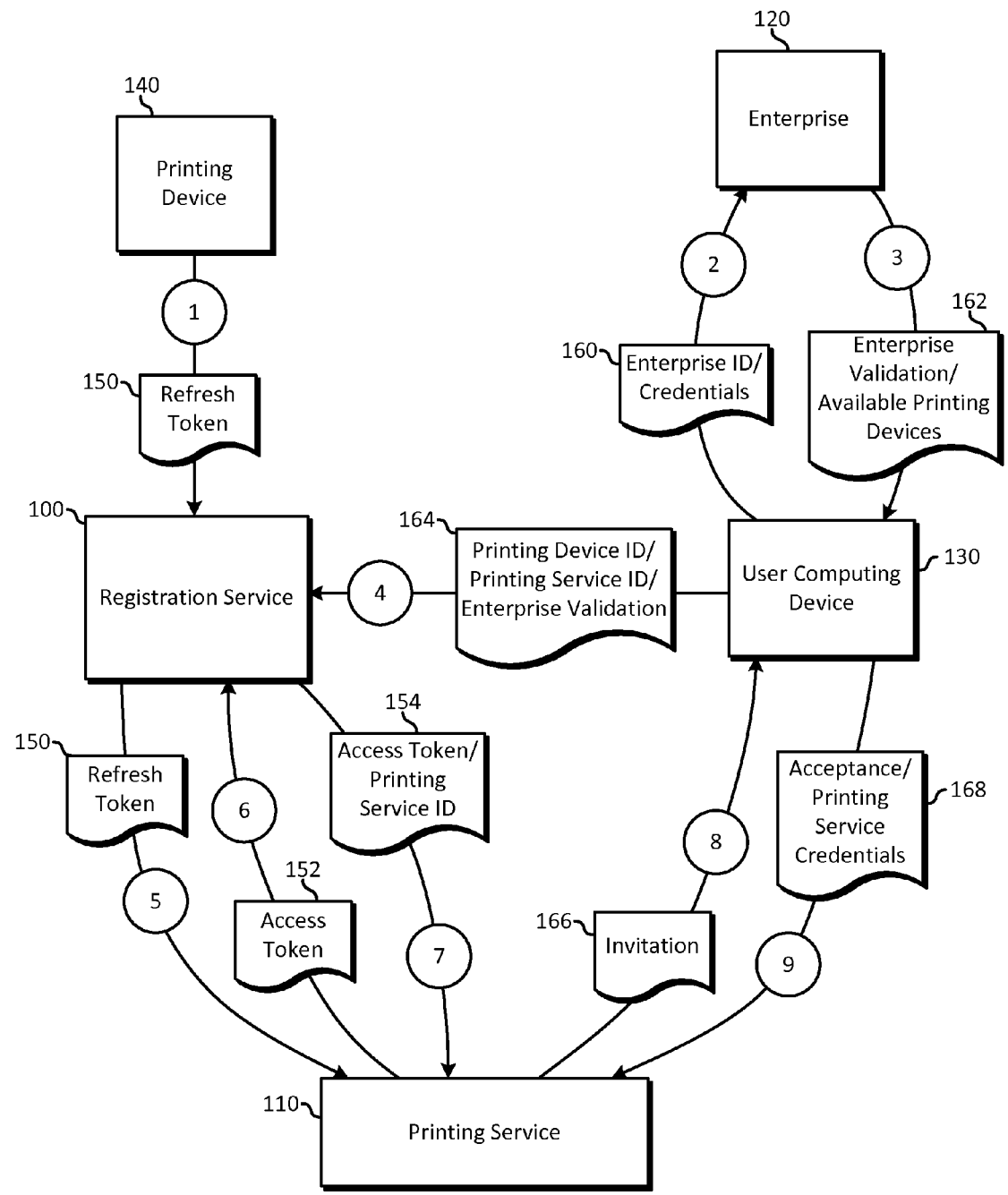
FIG. 1 is a block diagram that illustrates an example embodiment of a system for enterprise sharing of a distributed-printing-service-aware printing device.

FIG. 1 is a block diagram that illustrates an example embodiment of a system for enterprise sharing of a distributed-printing-service-aware printing device. Also, other embodiments of the system shown in FIG. 1 may add stages to stages 1-9, removes stages, or change the order of the stages. The system includes a registration service 100 (which includes one or more devices), a printing service 110 (which may be a distributed printing service and which includes one or more devices), an enterprise 120 (which includes one or more devices), a user computing device 130, and a distributed-printing-service-aware printing device 140 (also referred to herein as "printing device 140"). The organization associated with the enterprise 120 may be a company, a university, a government entity, a charitable organization, etc.

The printing device 140, when initially powered or when prompted by a user action, is configured to self-register with the printing service 110, and the printing service 110 issues a security token (e.g., public-key based tokens, shared-secret based tokens, a refresh token 150, an access token 152) or other credential to the printing device 140. Thus, when registration is finished, the printing device 140 will have a refresh token that may be used to get an access token, and the access token may be used to call other APIs. Also, the printing device 140 processes print jobs and/or communicates with the printing service 110 without a proxy. An account manager device associated with the printing service 110 may manage the issuance of and validation of credentials.

The printing device 140 and the printing service 110 communicate via one or more networks. The owner of the printing device 140 may associate the printing device 140 with a printing service identifier of the owner (which may be a social ID), and the owner informs the enterprise 120 that the printing device 140 is available for use by other users of the enterprise 120. The enterprise 120 adds the identifier (an identifier is also referred to herein as an "ID") of the printing device 140 (also referred to herein as the "printing device ID") to a list of available printing devices.

After registration, in stage 1 the printing device 140 sends a security token to the registration service 100, which stores the token and associates the security token with the printing device ID. Though this embodiment uses a refresh token 150 (e.g., a refresh token issued according to the OAuth 2.0 standard), other embodiments may use other tokens or other credentials (which may include certificates, passwords, identifiers, tokens, keys, hashes, codes, etc.). In stage 2, a user computing device 130 sends an enterprise ID/credentials 160 to the enterprise 120. The enterprise 120 authenticates and/or authorizes the associated user based on the received enterprise ID/credentials 160. If the associated user is successfully authenticated and/or authorized, in stage 3 enterprise validation/a list of available printing devices 162 is sent to the user computing device 130. The user computing device 130 acquires (e.g., from user selection) a printing device ID, selected from the list of available printing devices, and a printing service ID (which may be different than the enterprise ID). In stage 4, the user computing device 130 sends the printing device ID/printing service ID/enterprise validation 164 to the registration service 100.

In stage 5, the registration service 100 determines which refresh token 150 is associated with the received printing device ID and sends the refresh token 150 to the printing service 110. In response, in stage 6 the printing service 110 sends an access token 152 to the registration service 100. The access token 152 may be generated based on the refresh token 150, and may be specific for the printing device 140. Also, in some embodiments the access token 152 grants its holder authority to act as the owner of the printing device 140. Therefore, once the registration service 100 has the access token 152, the registration service 100 can initiate any of the operations that the owner of the printing device 140 can, including adding users, changing settings, etc. Next, in stage 7, the registration service 100 sends the access token (which may include the printing device ID)/printing service ID 154 to the printing service 110 in a request to add the printing service ID to the group of users permitted to use the printing device 140. In stage 8, an invitation 166 is generated for the associated printing service ID, and the invitation 166 is sent to the user computing device 130 (e.g., by the user computing device 130 polling the printing service 110 for the printing service ID, sending the invitation 166 to an account associated with the printing service ID). Finally, in stage 9, the user computing device 130 sends an invitation acceptance/printing service credentials 168 to the printing service 110. The printing service credentials demonstrate that the user computing device 130 is authorized to accept the invitation on behalf of the user associated with the printing service ID. Thereafter, by using the printing service ID, the user computing device 130 may then control functions (e.g., print data on, change print settings) of the printing device 140, and the user computing device 130 may communicate with the printing device 140 via the printing service 110, without communicating via the enterprise 120 or the registration service 100.

For example, in one embodiment, upon successful registration, a printing device 140 acquires a refresh token (150) from a printing service 110. Also, the owner of the printing device 140 makes the printing device 140 available in an enterprise environment (e.g., within a business), and sends the ID of the printing device 140 (printing device Z), which may also indicate the location of the printing device 140, and the ID of the owner to an enterprise 120. The owner also sends the registration service 100 the identity of the enterprise 120 (enterprise A), and the registration service 100 associates the printing device 140, (printing device Z) with the enterprise 120 (enterprise A). Additionally, the printing device 140 (printing device Z) sends the refresh token (150) to a registration service 100. The registration service 100 may be part of a cloud computing service, and the printing device 140 (printing device Z) may be configured to automatically send the refresh token (150) to the registration service 100. The registration service 100 stores the refresh token (150) and associates the refresh token (150) with printing device Z.

A user computing device 130 operating in an enterprise environment sends an enterprise ID and credentials (160) to the enterprise 120 (enterprise A) in order to access the enterprise 120 (enterprise A). The enterprise ID and credentials (160) may establish that the associated user is a member of the organization associated with the enterprise 120 (enterprise A). If the enterprise ID (for example, "user X") and credentials (160) are valid, the enterprise 120 (enterprise A) returns an indicator of enterprise validation, as well as a list of available printing devices (162). The enterprise validation may be sent separately from the list of available printing devices. For example, the enterprise validation may be automatically sent to the user computing device 130 in response to a successful validation of the enterprise ID and credentials, and the list of available printing devices (which includes printing device Z) may be sent to the user computing device 130 in response to a request for printing devices sent by the user computing device 130.

A user of the user computing device 130 selects a printing device from the received list of printing devices, and sends the selected printing device ID (printing device Z) to the registration service 100. Additionally, the user computing device 130 sends the enterprise validation so the registration service 100 can confirm that the user computing device 130 is allowed to access the resources of the enterprise 120 (enterprise A), and the user computing device 130 sends the printing service ID of the user (user 12). As illustrated in this example, the printing service ID, user 12, may be different than the enterprise ID, user X.

The registration service 100 confirms that the user is allowed to access the resources of the enterprise 120 based on the received enterprise validation. The registration service 100 then sends the printing device ID (printing device Z), printing service ID (user 12), and the access token (154) to the printing service 110, with a request to allow the indicated user to access the printing device 140. The printing service 110 then validates the access token (152). If the validation is successful, the printing service 110 considers the request to have been issued by the owner of the printing device 140 and sends an invitation (166) to the user associated with the printing service ID (user 12). The user computing device 130 then replies with an acceptance from the user (user 12) and the user's printing service credentials (168). For example, the printing service 110 may send the invitation in an email to an account associated with user 12. The user computing device 130 may access the email and send an acceptance to the printing service 110. If the printing service 110 operates the email account associated with user 12, the user computing device 130 may first provide the printing service credentials in order to access the email account of user 12, and then retrieve the email and send the acceptance of the invitation via the email account.

Figure 2:
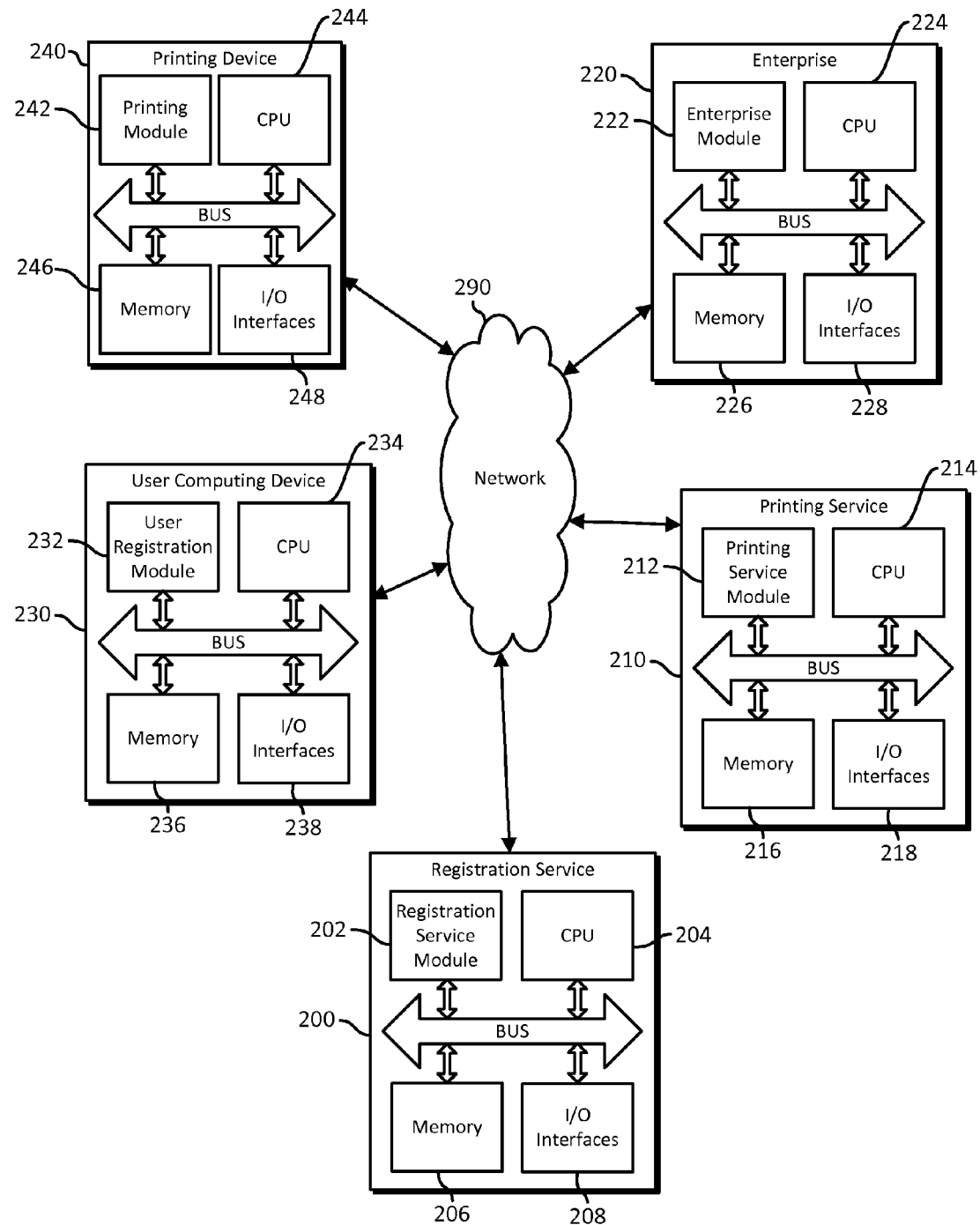
FIG. 2 is a block diagram that illustrates an example embodiment of a system for enterprise sharing of a distributed-printing-service-aware printing device.

FIG. 2 is a block diagram that illustrates an example embodiment of a system for enterprise sharing of a distributed-printing-service-aware printing device. The system includes a registration service 200, a printing service 210, an enterprise 220, a user computing device 230, and a printing device 240, each of which may include one or more computing devices. Computing devices include, for example, desktops, laptops, servers, mainframes, personal digital assistants, tablet computers, cellular phones (including smart phones), etc. The computing devices may communicate via one or more networks 290, and the one or more networks 290 may include one or more of a LAN, a WAN, a personal network, the Internet, a wired network, and a wireless network. One or more of the registration service 200, the printing service 210, and the enterprise 220, may operate in a distributed computing environment (e.g., a cloud computing environment), including an environment where computing, software, platforms, or infrastructure are provided as a service. Therefore, the registration service 200, the printing service 210, the enterprise 220, the printing device 240, and the user computing device 230 may be physically located miles apart.

The registration service 200 includes a CPU 204, memory 206, and I/O interfaces 208. The CPU 204 includes one or more computer processors, such as single core or multi-core central processing units and/or micro-processing units, and the CPU 204 may be incorporated in a stand-alone apparatus or in a multi-component apparatus. The CPU 204 may implement computer-executable instructions and/or control the implementation of computer-executable instructions by other members of a device (e.g., the registration service 200).

A memory 206 includes one or more computer-readable media, and thus is configured to store computer-readable data and/or computer-executable instructions. The memory 206 may include, for example, one or more of a magnetic disk (e.g., a flexible disk (floppy disk), a hard disk, redundant array of independent disks (RAID)), an optical disc (e.g., CD, DVD, Blu-ray), a magneto-optical disk, a micro-drive, solid-state memory (e.g., read only memory (ROM), random access memory (RAM), DRAM, SRAM, flash memory, video RAM (VRAM), a nonvolatile memory card, a solid state drive, erasable programmable read only memory (EPROM), electrically erasable programmable read only memory (EEPROM)), a magnetic tape or card, and an optical card.

The registration service 200 also includes one or more I/O interfaces 208. The I/O interfaces 208 provide communication interfaces to input and output devices, which may include a keyboard, a display device, a mouse, one or more controls (e.g., buttons, switches, dials), a touch screen, a scanner, a microphone, a drive, and a network (either wired or wireless).

Additionally, the registration service 200 includes a registration service module 202. A module includes instructions that may be executed by a computing device to cause the computing device to perform certain operations, though for purposes of description a module may be described as performing the operations. Modules may include logic, computer-readable data, and computer-executable instructions and may be implemented in software (e.g., Assembly, C, C++, C#, Java, BASIC, Perl, Visual Basic), firmware, and/or hardware. Other embodiments may include additional or less modules, combine modules into fewer modules, or divide modules into more modules. One or more of the registration service module 202 and the other modules shown in FIG. 2 (the printing service module 212, the enterprise module 222, the user registration module 232, and the printing module 242) may be executed by one or more computing devices to implement the methods described herein.

The printing service 210 includes a CPU 214, memory 216, I/O interfaces 218, and a printing service module 212. The printing service module 212 operates a printing service that allows users to send print jobs to printing devices via one or more networks 290. The printing service module 212 directs print jobs, converts the respective formats of print jobs, communicates with an account manager associated with the printing service 210, and/or manages users and printing devices (including printing device 240).

The enterprise 220 includes a CPU 224, memory 226, I/O interfaces 228, and an enterprise module 222. The enterprise module 222 tracks printing devices (e.g., printing device 240) that are available for use by members of the organization associated with the enterprise 220. The enterprise module 222 may associate owners with printing devices, maintain data that indicates the printing devices a particular user is allowed to access, validate users, associate printing service IDs with respective enterprise IDs, communicate with the sharing service 200, and/or track the printing devices a user has been invited to use.

The user computing device 230 includes a CPU 234, memory 236, I/O interfaces 238, and a user registration module 232. The user registration module 232 acquires information that indicates the printing devices in an organization associated with the enterprise 220 that are available to be shared with a user, sends enterprise IDs and enterprise credentials to the enterprise 220, receives enterprise validations, sends printing service IDs, printing device IDs, and enterprise validations to the registration service 200, receives invitations from a printing service 210, and/or sends invitation acceptances and printing service credentials to the printing service 210.

The printing device 240 includes a CPU 244, memory 246, I/O interfaces 248, and a printing module 242. The printing module 242 self-registers the printing device 240 with the printing service 210, receives one or more tokens from the printing service, receives print jobs, and/or sends one or more tokens to the registration service 200.

Figure 3:
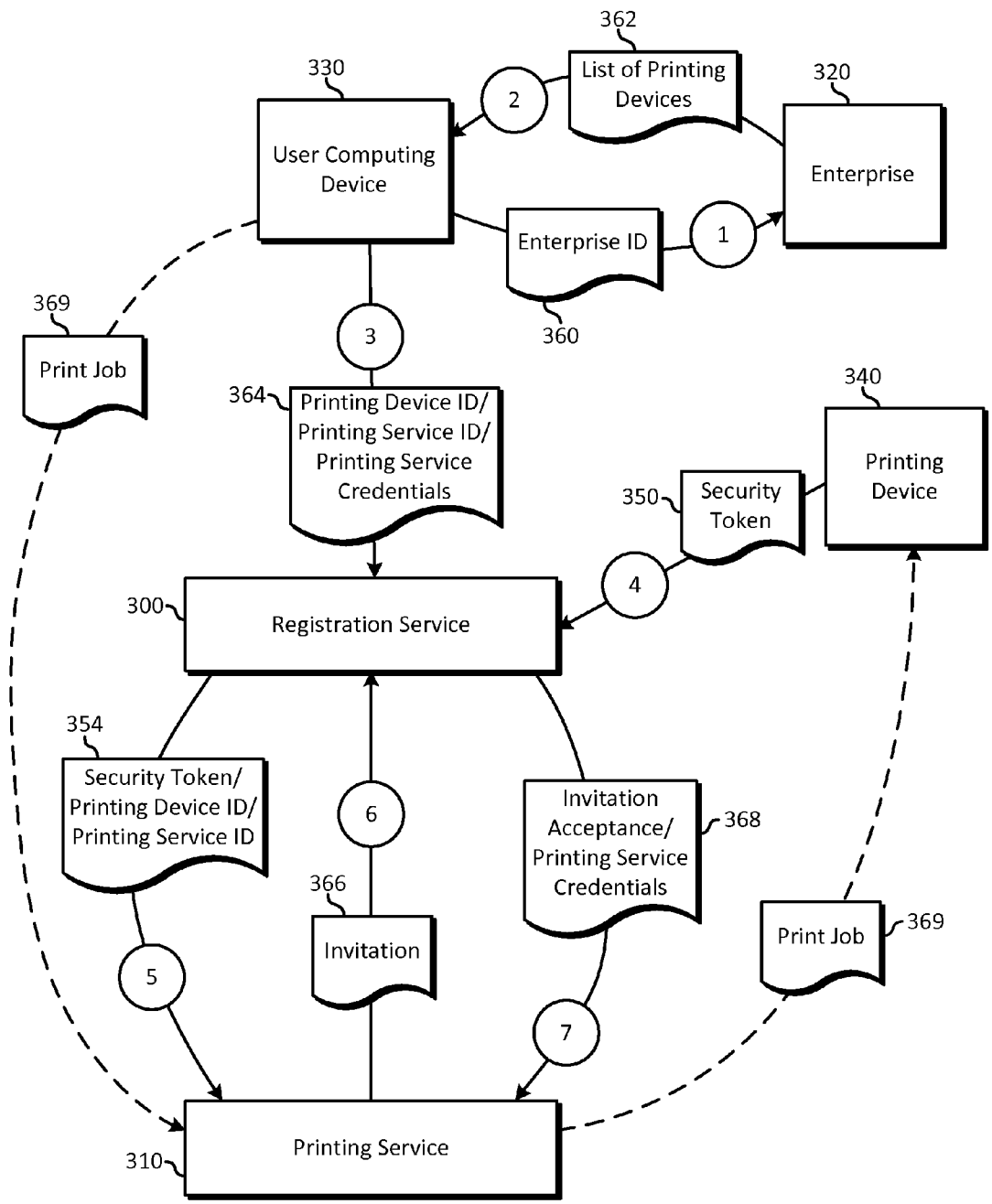
FIG. 3 is a block diagram that illustrates an example embodiment of a system for enterprise sharing of a distributed-printing-service-aware printing device.

FIG. 3 is a block diagram that illustrates an example embodiment of a system for enterprise sharing of a distributed-printing-service-aware printing device. The printing device 340 self-registers with the printing service 310 and acquires a security token 350. In stage 1, a user computing device 330 sends an enterprise ID 360 and enterprise credentials to an enterprise 320. The enterprise 320 determines if the enterprise ID 360 and the accompanying credentials are valid, and, if so, sends an enterprise validation/list of available printing devices 362 to the user computing device 330 in stage 2. In stage 3, the user computing device 330 sends the printing device ID (extracted from the list of printing devices 362)/printing service ID/printing service credentials 364 to the registration service 300.

In stage 4, the printing device 340 sends the security token 350 to the registration service 300, which stores the security token 350 and associates the security token with the printing device 340 (e.g., by associating the security token 350 with the printing device ID). In stage 5, the registration service 300 sends the security token/printing device ID (if the printing device is not identified by the security token)/printing service ID 354 to the printing service 310 with a request to share the printing device 340 with the user indicated by the printing service ID. In response, in stage 6 the printing service 310 sends an invitation 366 for the user associated with the printing service ID to use the printing device. The registration service 300 receives the invitation, which may be sent directly to the registration service 300 or retrieved by the registration service 300 (e.g., by accessing an email account of the user, by polling). In response to receiving the invitation 366, in stage 7 the registration service 300 sends an invitation acceptance and printing service credentials 368 to the printing service 310. By using the printing service ID, the user computing device 330 can then send a print job 369 to the printing device 340 via the printing service 310, without the print job 369 being sent to the registration service 300 or the enterprise 320.

Figure 4:
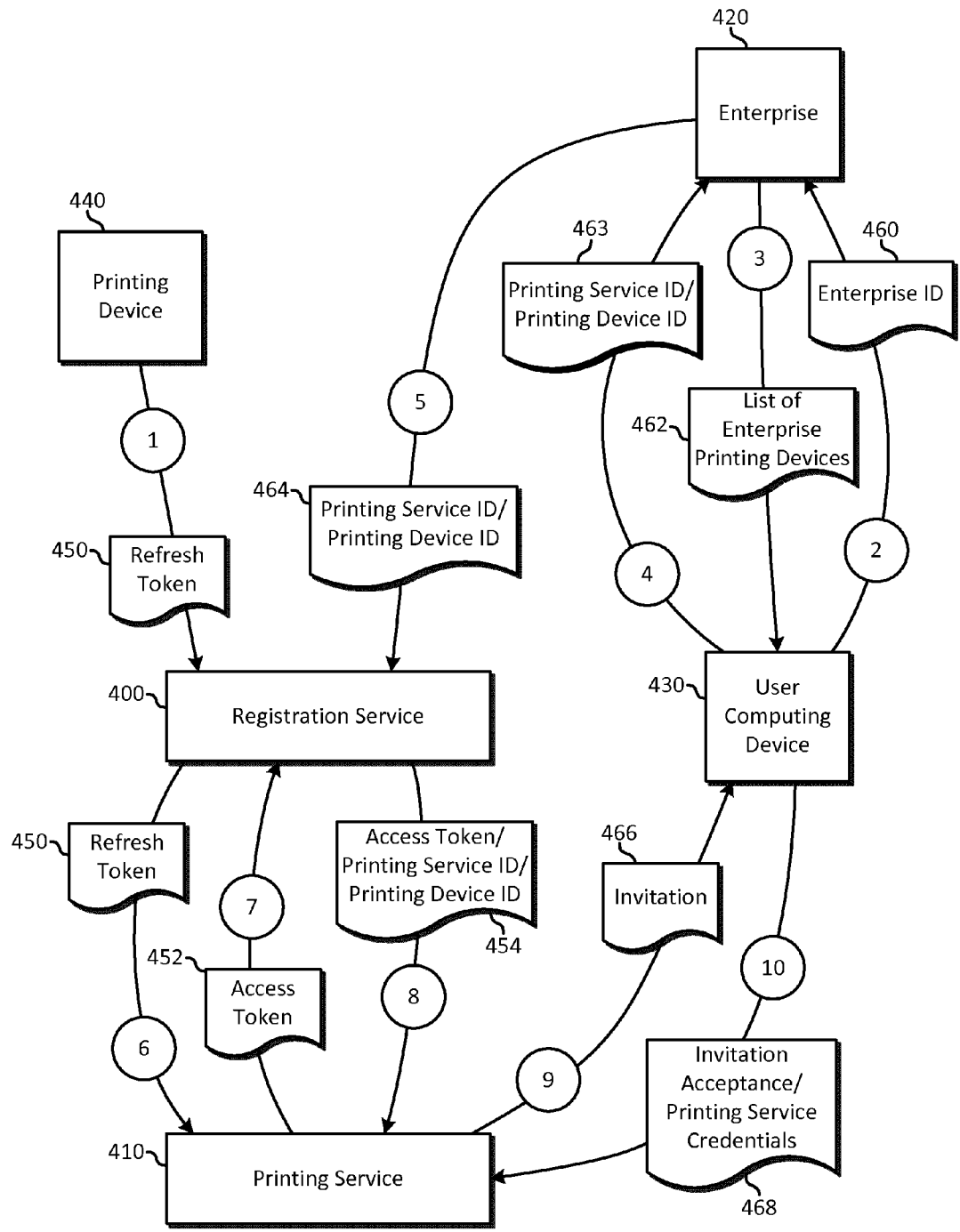
FIG. 4 is a block diagram that illustrates an example embodiment of a system for enterprise sharing of a distributed-printing-service-aware printing device.

FIG. 4 is a block diagram that illustrates an example embodiment of a system for enterprise sharing of a distributed-printing-service-aware printing device. In stage 1, a printing device 440 sends a refresh token 450 to a registration service 400. In stage 2, a user computing device 430 sends an enterprise ID 460 to an enterprise 420. In stage 3, the enterprise 420 replies by sending a list of enterprise printing devices 462 (which lists the printing device 440) to the user computing device 430. In stage 3, the user computing device 430 sends a printing service ID/printing device ID 463 to the enterprise 420. The enterprise 420 may record (e.g., in a computer-readable medium) the association between the enterprise ID, printing service ID, and the printing device ID. Next, in stage 5, the enterprise 420 sends the printing service ID/printing device ID 464 to the registration service 400.

In stage 6, the registration service 400 sends the refresh token 450 to the printing service 410. In reply, in stage 7 the printing service 410 sends an access token 452 to the registration service 400. The registration service 400 then sends the access token/printing service ID/printing device ID 454 to the printing service 410 in stage 8. The printing service 410 sends an invitation 466 to the user associated with the printing service ID, based on contact information associated with the printing service ID. The user computing device 430 acquires the invitation 466 in stage 9, and, in stage 10, sends an invitation acceptance/printing service credentials 468 to the printing service 410.

Figure 5:
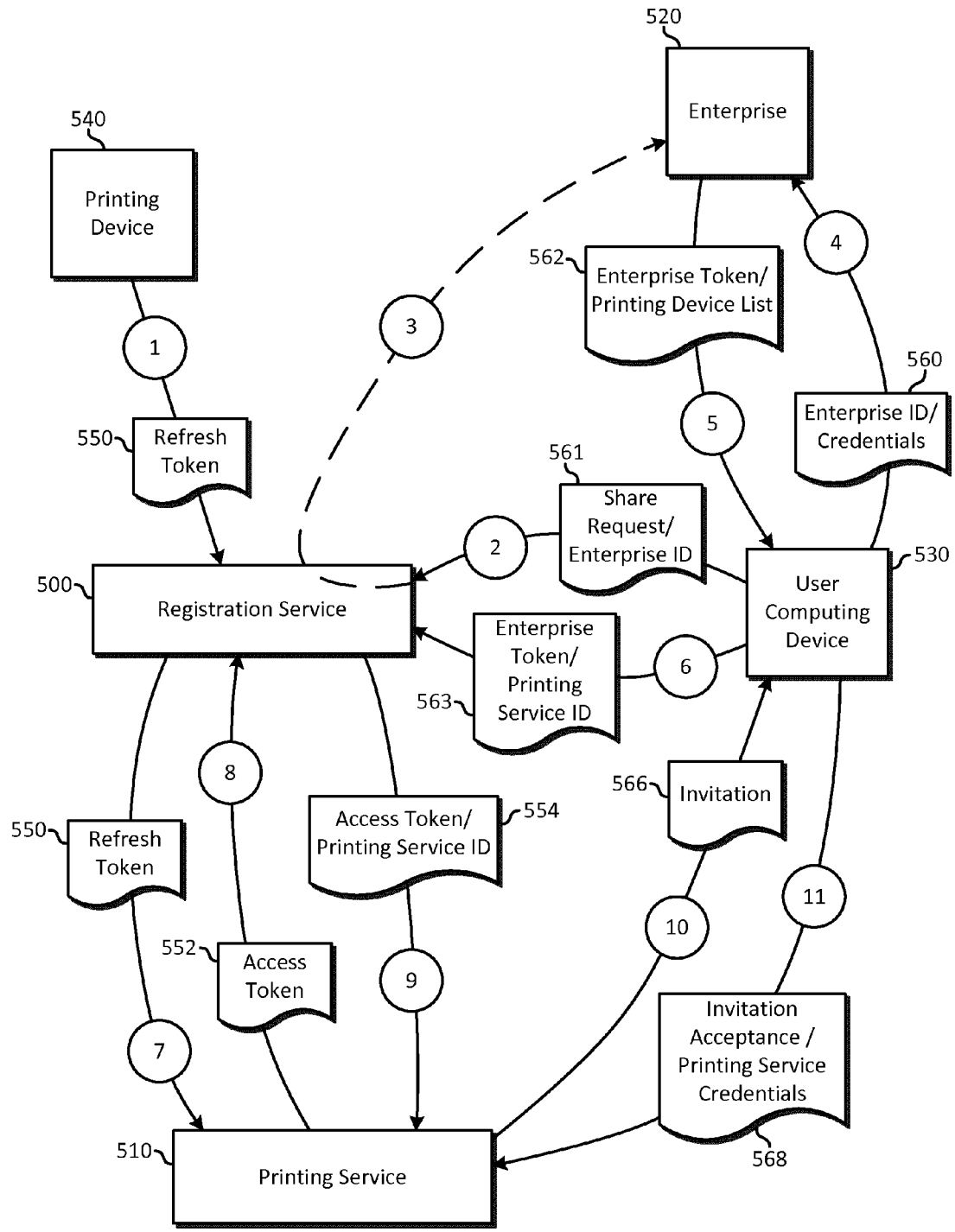
FIG. 5 is a block diagram that illustrates an example embodiment of a system for enterprise sharing of a distributed-printing-service-aware printing device.

FIG. 5 is a block diagram that illustrates an example embodiment of a system for enterprise sharing of a distributed-printing-service-aware printing device. In stage 1, a printing device 540 sends a refresh token 550 to a registration service 500. In stage 2, a user computing device 530 sends a printing device share request/enterprise ID 561 to the registration service 500. The printing device share request is a request for access to one or more printing devices. In stage 3, based on the enterprise ID, which the registration service 500 uses to determine the associated enterprise (e.g., the enterprise ID may indicate the enterprise, the registration service 500 may store data that associates the enterprise ID with the enterprise), the registration service 500 redirects the printing device share request/enterprise ID to the enterprise 520, thus establishing communication between the user computing device 530 and the enterprise 520. In stage 4, the user computing device 530 sends an enterprise ID/enterprise credentials 560 to the enterprise 520. If the enterprise 520 determines that the received enterprise ID/enterprise credentials 560 are valid, in stage 5 the enterprise 520 sends an enterprise token/printing device list 562 to the user computing device 530.

In stage 6, the user computing device 530 sends the enterprise token/printing service ID 563 and the printing device ID of a selected printing device (e.g., printing device 540) to the registration service 500. The registration service 500 determines if the enterprise token is valid, and, if valid, sends the refresh token 550 associated with the printing device ID to the printing service 510 in stage 7. In response, in stage 8 the printing service 510 sends an access token 552 to the registration service 500. In stage 9, the registration service 500 sends the access token/printing service ID 554 (and, depending on the embodiment, the printing device ID) to the printing service 510. The printing service 510 sends an invitation 566 to the user computing device 530 in stage 10. Then, in stage 11, the user computing device 530 sends an invitation acceptance/printing service credentials 568 to the printing service 510, which allows the printing service ID to be used to access to the printing device 540.

Figure 6:
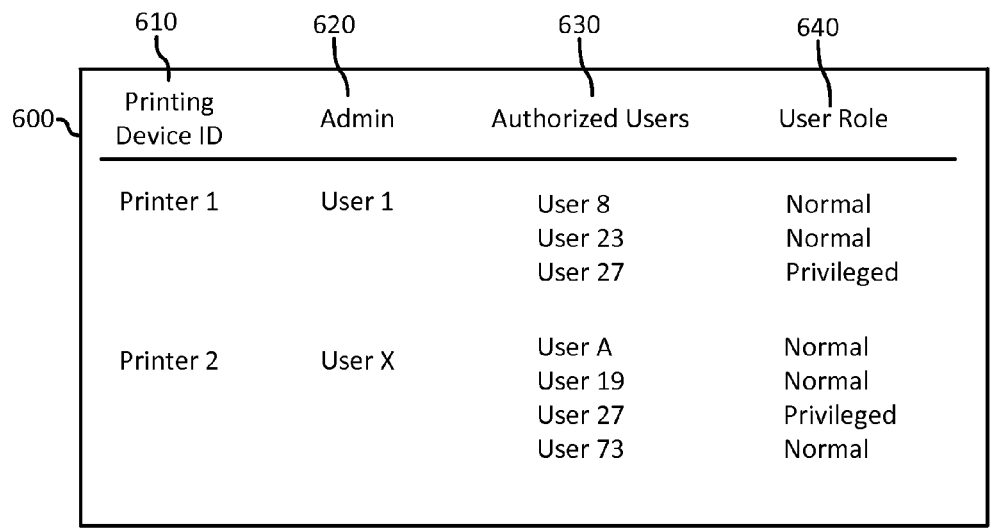
FIG. 6 illustrates an example embodiment of data entries stored in databases for enterprise sharing of a distributed-printing-service-aware printing device.
Figure 6:
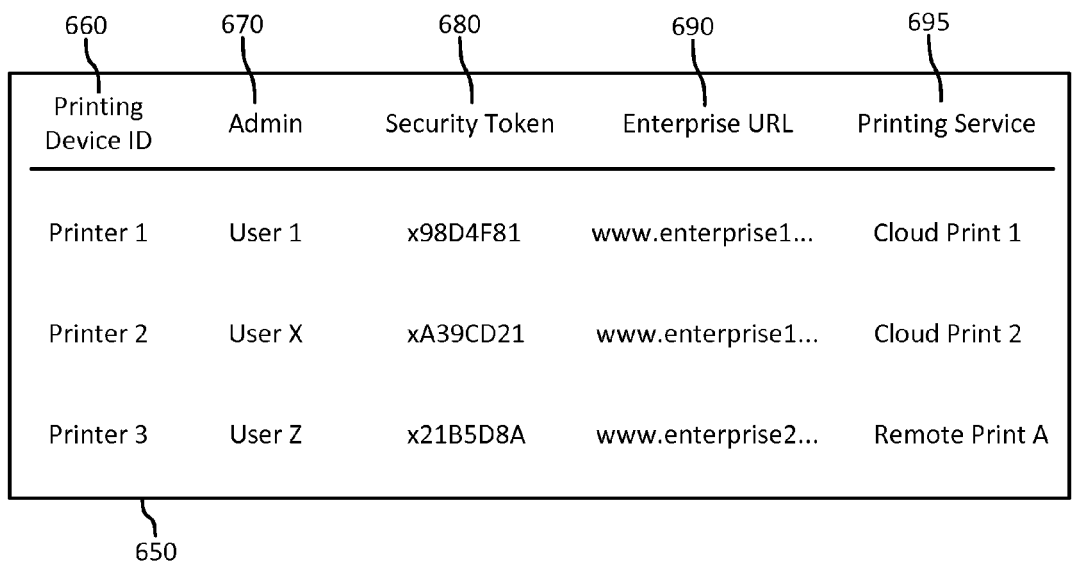

FIG. 6 illustrates an example embodiment of data entries for enterprise sharing of a distributed-printing-service-aware printing device. An enterprise data entry 600 associates printing device IDs 610 with printing device administrators 620, authorized printing device users 630, and user roles 640. In this embodiment, the ID associated with a printing device administrator 620 is an enterprise ID, and the ID associated with an authorized user 630 is also an enterprise ID. An administrator may be the owner of the printing device who makes the printing device available to other enterprise users. The enterprise data entry 600 also indicates a user role 640 (e.g., normal, restricted, privileged) associated with the authorized users 630. The administrator may be assumed to be a privileged user of the printing device.

An enterprise may generate and store an enterprise data entry. When an enterprise user sends a request to an enterprise for a list of printing devices, the enterprise can use the enterprise data entry 600 to determine which printing devices the enterprise user is allowed to use. For example, if user 8 sends a request, an enterprise can determine, based on the enterprise data entry 600, that user 8 is authorized to use printer 1 as a normal user. Also, if user 27 sends a request, based on the enterprise data entry an enterprise can determine that user 27 is authorized to use both printer 1 and printer 2 as a privileged user.

A registration entry 650 associates printing device IDs 660 with an admin 670, a security token 680, an enterprise URL 690, and a printing service 695. Therefore, a registration service can generate and store a registration entry 650, and refer to the registration entry 650 to map a request to share a printing device, indicated by a printing device ID, to an admin 670, a security token 680, an enterprise URL 690, and a printing service 695. The registration service may determine if the request comes from an authorized user of the enterprise based on the enterprise URL 690. Also, the registration service may send the security token 680 associated with the printing device ID to a printing service along with a request that a user be allowed to share the printing device.

For example, if a request from user 19 (a printing service ID) to share printer 2 is received, the registration service may use the registration entry 650 to map printer 2 to enterprise 1, security token xA39CD21, and printing service Cloud Print 2. The registration service may verify that user 19 has been authorized by enterprise 1 to use printer 2 (e.g., based on a received credential) and send the security token and the printing service ID (user 19) to Cloud Print 2.

Figure 7:
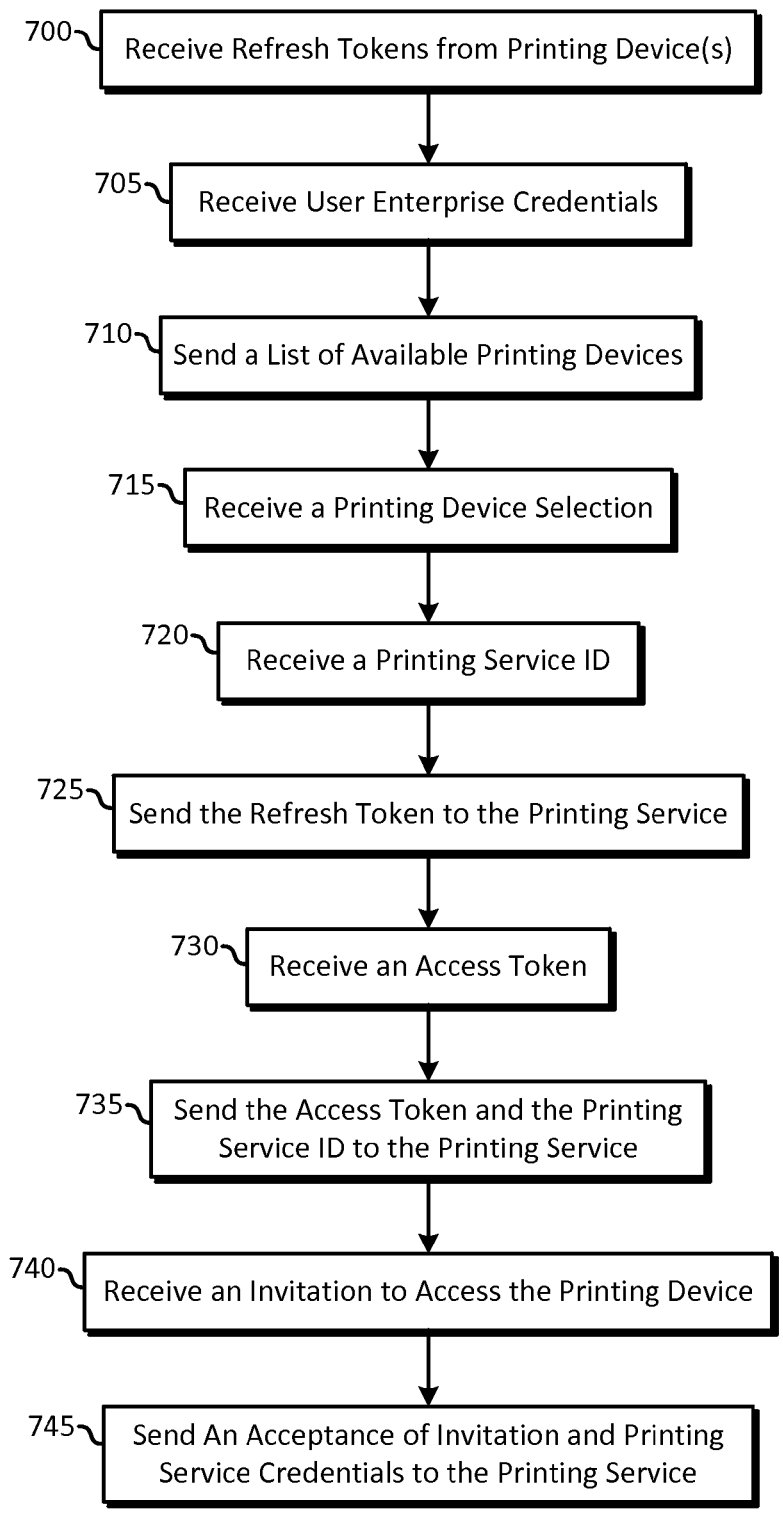
FIG. 7 is a flow diagram that illustrates an example embodiment of a method for enterprise sharing of a distributed-printing-service-aware printing device.

FIG. 7 is a flow diagram that illustrates an example embodiment of a method for enterprise sharing of a distributed-printing-service-aware printing device. Other embodiments of this method and the other methods described herein may omit blocks, add blocks, change the order of the blocks, combine blocks, and/or divide blocks into separate blocks. For example, some embodiments of the methods described herein may include only the blocks performed by a particular device or devices (e.g., enterprise, registration service). Additionally, one or more components of the systems and devices described herein may implement the method shown in FIG. 7 and the other methods described herein.

Flow starts in block 700, where a refresh token is received from a printing device. Next, in block 705, user enterprise credentials are received. If the enterprise credentials are valid (e.g., as determined by an enterprise), flow proceeds to block 710, where a list of available printing devices are sent to the requestor (e.g., user computing device). Then, in block 715, a printing device selection is received. The printing device selection may be in the form of a printing device ID. In block 720, a printing service ID is received. Next, in block 725, the refresh token associated with the selected printing device is sent to the printing service, and in block 730, an access token is received from the printing service. Flow proceeds to block 735, where the access token and the printing service ID are sent to the printing service with a share request. In block 740, an invitation to access the printing device is received (e.g., by polling, passive receipt). Finally, in block 745, an acceptance of invitation and printing service credentials are sent to the printing service.

Figure 8:
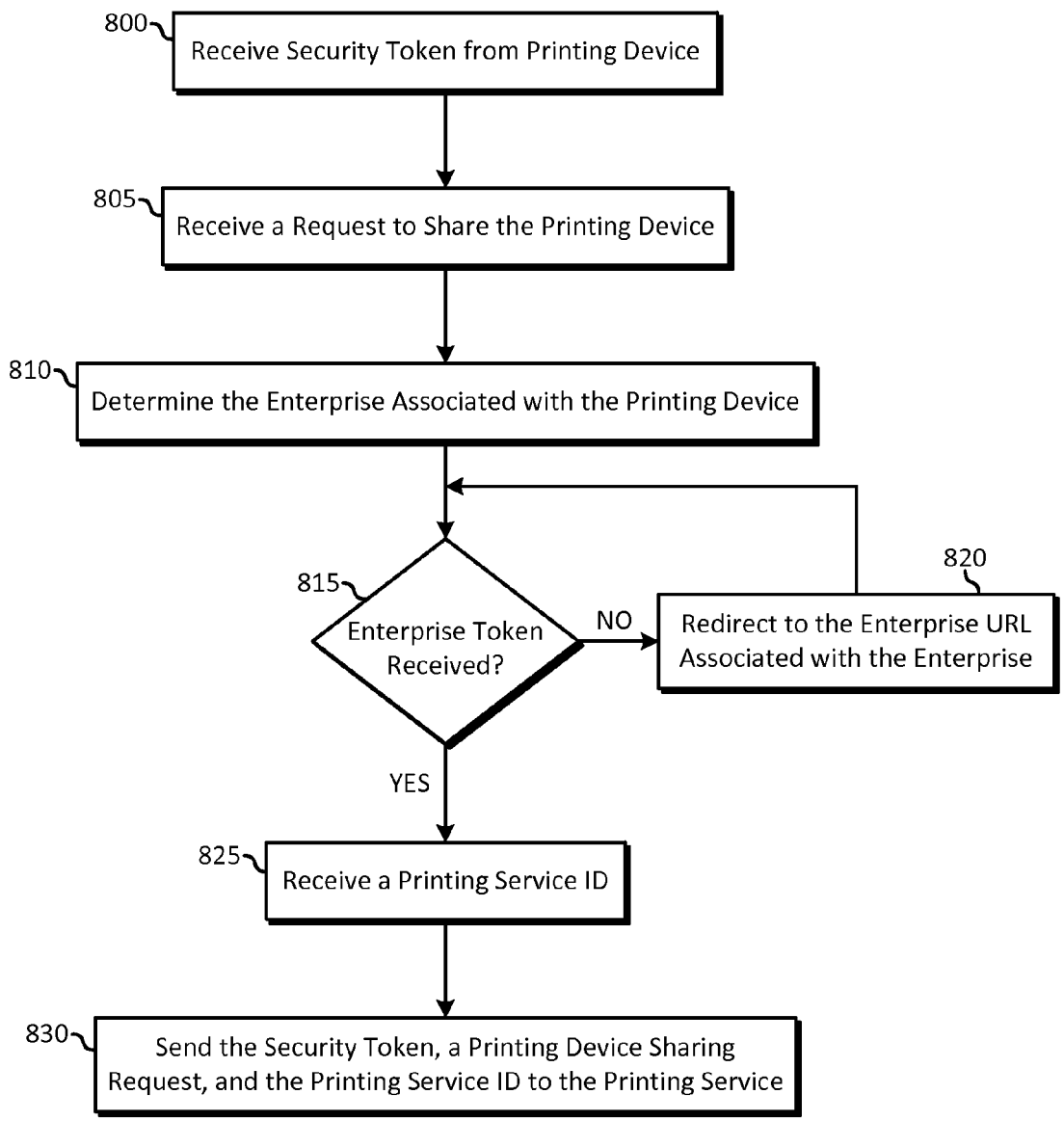
FIG. 8 is a flow diagram that illustrates an example embodiment of a method for enterprise sharing of a distributed-printing-service-aware printing device.

FIG. 8 is a flow diagram that illustrates an example embodiment of a method for enterprise sharing of a distributed-printing-service-aware printing device. Flow begins in block 800, where a security token is received from a printing device. Next, in block 805, a request to share a printing device is received. The request may indicate a specific printing device (e.g., by including the printing device ID). Flow proceeds to block 810, where the enterprise associated with the printing device is determined.

Moving to block 815, it is determined if an enterprise token has been received. If not, the request to share a printing device is redirected to the enterprise URL associated with the enterprise in block 820. Flow then returns to block 815, where flow waits for receipt of an enterprise token from the enterprise. If the enterprise token has been received, flow proceeds to block 825, where a printing service ID is received. Next, in block 830, the security token, a printing device sharing request, and the printing service ID are sent to the printing service.

Figure 9:
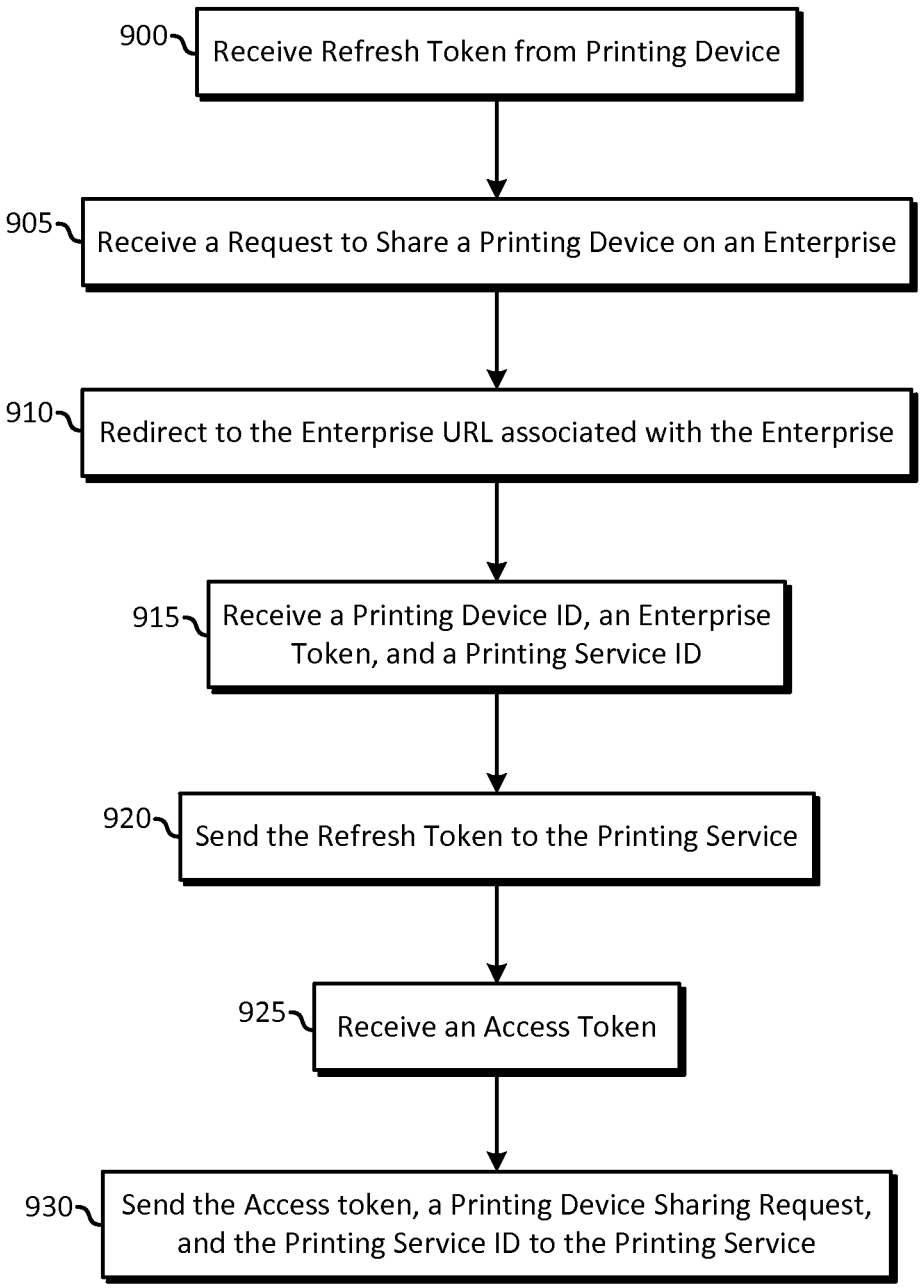
FIG. 9 is a flow diagram illustrates an example embodiment of a method for enterprise sharing of a distributed-printing-service-aware printing device.

FIG. 9 is a flow diagram illustrates an example embodiment of a method for enterprise sharing of a distributed-printing-service-aware printing device. Flow starts in block 900, where a refresh token is received from a printing device. Then, in block 905, a request to share a printing device on an enterprise is received. The request may not indicate a specific printer (e.g., may be a request for a list of available printers). Next, in block 910, the request is redirected to the enterprise URL associated with the enterprise. Flow proceeds to block 915, where a printing device ID, an enterprise token, and a printing service ID are received (e.g., from an enterprise and/or from a user computing device), along with a share request. Next, in block 920, the refresh token associated with the printing device ID is sent to the associated printing service. Flow moves to block 925, where an access token is received, and, in block 930, the access token, a printing device sharing request, and the printing service ID are sent to the associated printing service.

Figure 10:
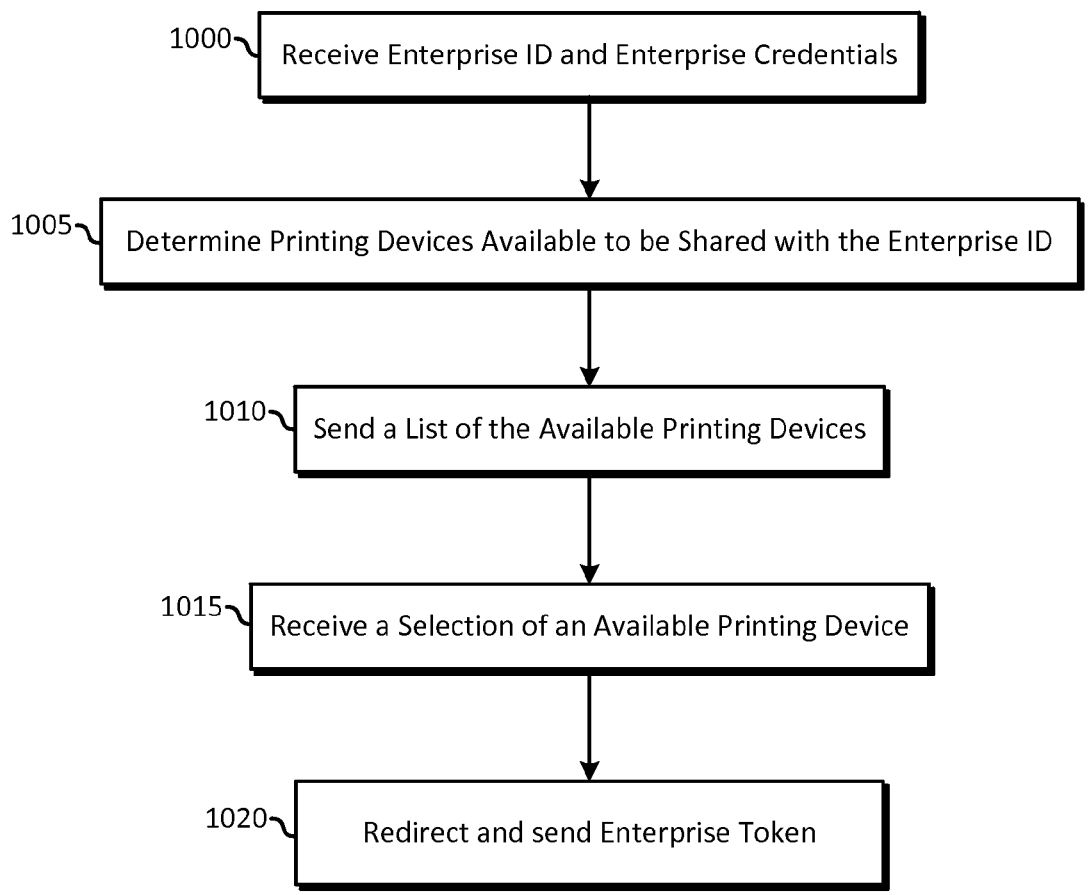
FIG. 10 is a flow diagram that illustrates an example embodiment of a method for enterprise sharing of a distributed-printing-service-aware printing device.

FIG. 10 is a flow diagram that illustrates an example embodiment of a method for enterprise sharing of a distributed-printing-service-aware printing device. Flow starts in block 1000, where an enterprise ID and enterprise credentials are received (e.g., by an enterprise). Next, in block 1005, printing devices that are available to be shared with the enterprise ID are determined. Afterwards, in block 1010, a list of the available printing devices is sent, for example to the device (e.g., user computing device) that sent the enterprise ID and/or enterprise credentials. Next, in block 1015, a selection of an available printing device is received (e.g., from the user computing device). Finally, in block 1020 the selection is redirected (e.g., to a registration service) and an enterprise token is sent to the device that is the redirect destination.

Figure 11:
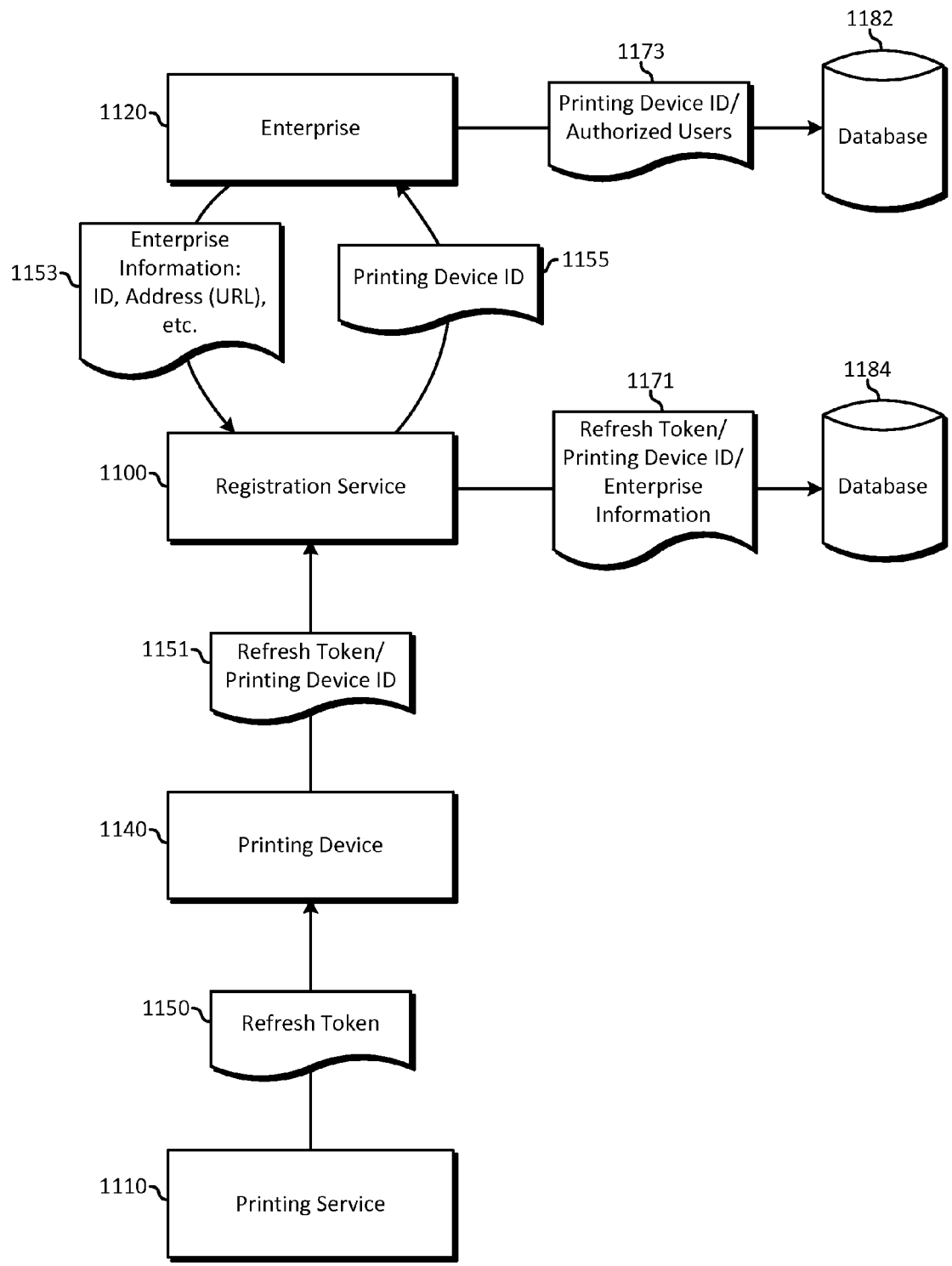
FIG. 11 is a block diagram that illustrates an example embodiment of a system for enterprise sharing of a distributed-printing-service-aware printing device.

FIG. 11 is a block diagram that illustrates an example embodiment of a system for enterprise sharing of a distributed-printing-service-aware printing device. The system includes a registration service 1100, a printing service 1110, a printing device 1140, and an enterprise 1120. During registration of the printing device 1140, the printing service 1110 sends a refresh token 1150 to the printing device 1140. The printing device 1140 sends the refresh token/printing device ID 1151 to the registration service 1100. The registration service 1100 sends the printing device ID 1155 to the enterprise 1120. The enterprise 1120 sends the registration service 1100 enterprise information (ID, address (URL), etc.). Additionally, the enterprise 1120 stores the printing device ID/authorized users 1173 in a database 1182. The registration service 1100 stores the refresh token/printing device ID/enterprise information 1171 in a database 1184. Thus, after setup, the printing device 1140 stores the refresh token, the registration service 1100 stores the refresh token, printing device ID, and enterprise information in a database 1184, and the enterprise stores the printing device ID and the associated authorized users in a database 1182.

Figure 12:
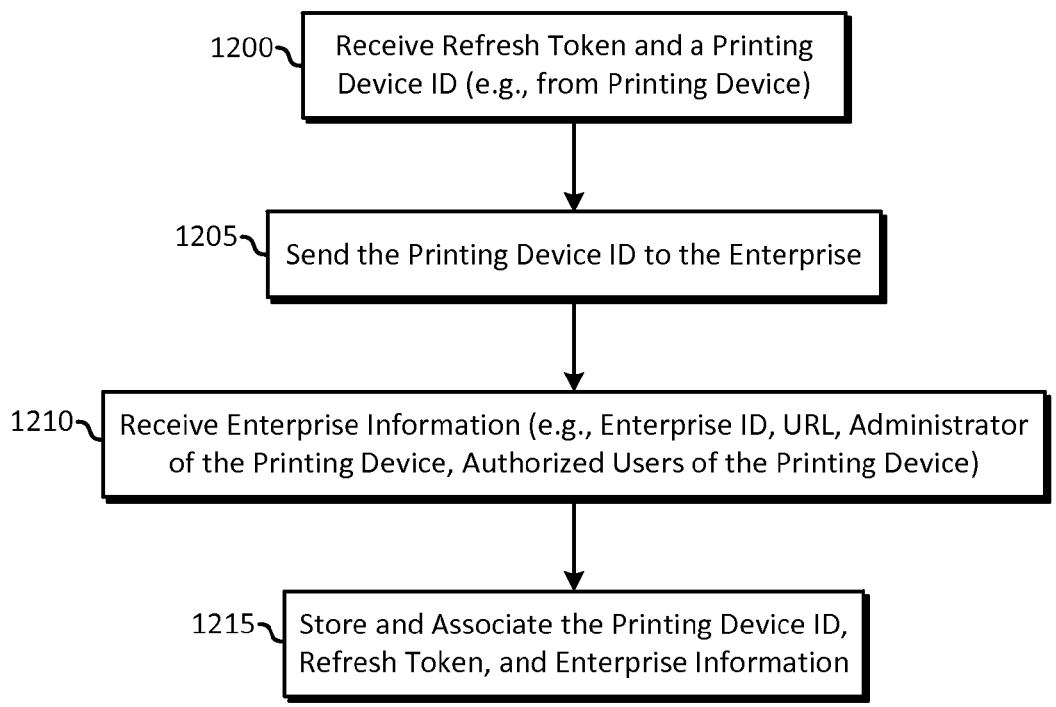
FIG. 12 is a flow diagram that illustrates an example embodiment of a method for enterprise sharing of a distributed-printing-service-aware printing device.

FIG. 12 is a flow diagram that illustrates an example embodiment of a method for enterprise sharing of a distributed-printing-service-aware printing device. Flow starts in block 1200, where a refresh token and a printing device ID are received (e.g., received from a printing device). The refresh token and the printing device ID may be received, for example, by a registration service. Flow proceeds to block 1205, where the printing device ID is sent to an enterprise. Next, in block 1210, enterprise information is received. Enterprise information may include one or more of an enterprise ID, an enterprise URL, an administrator of the printing device, and authorized users of the printing device. Finally, in block 1215, the printing device ID, refresh token, and enterprise information are associated with each other and stored (e.g., by a registration service). The printing device ID, refresh token, and enterprise token may be stored in the form of a registration entry (e.g., the registration entry 650 shown in FIG. 6).

The above described devices, systems, and methods can be achieved by supplying one or more storage media having stored thereon computer-executable instructions for realizing the above described operations to one or more computing devices that are configured to read the computer-executable instructions stored in the one or more storage media and execute them. In this case, the one or more computing devices perform the operations of the above-described devices, systems, and methods when executing the computer-executable instructions read from the one or more storage media. Also, an operating system on the one or more systems and/or devices may implement the operations of the above described devices, systems, and methods. Thus, the computer-executable instructions and/or the one or more storage media storing the computer-executable instructions thereon constitute an embodiment.

Any applicable computer-readable storage medium (e.g., a magnetic disk (including a floppy disk, a hard disk), an optical disc (including a CD, a DVD, a Blu-ray disc), a magneto-optical disk, a magnetic tape, and a solid state memory (including flash memory, DRAM, SRAM, a solid state drive)) can be employed as a storage medium for the computer-executable instructions. The computer-executable instructions may be written to a computer-readable storage medium provided on a function-extension board inserted into a device or on a function-extension unit connected to a device, and a CPU provided on the function-extension board or unit may implement the operations of the above-described devices, systems, and methods.

This disclosure has provided a detailed description with respect to particular explanatory embodiments. The scope of the appended claims is not limited to the above-described embodiments, and various changes and modifications may be made without departing from the scope of the claims.

What is claimed is:

1. A method for registering a printing device, the method comprising:
   receiving a selection of a printing device available on an enterprise, wherein the selection includes a printing device identifier associated with the printing device;
   receiving a credential issued by an enterprise device, wherein the enterprise device is associated with the enterprise;
   receiving a refresh token from the printing device at the registration service;
   receiving a printing service user identifier at the registration service;
   sending the refresh token to the printing service from the registration service;
   receiving an access token from the printing service at the registration service; and
   sending the access token, the printing device identifier, a share request, and the printing service user identifier to the printing service.

2. The method of claim 1, further comprising:
   receiving an invitation, associated with the printing service user identifier, to access the printing device via the printing service;
   sending a credential associated with the printing service user identifier to the printing service; and
   sending an accept invitation associated with the printing service user identifier to the printing service.

3. The method of claim 1, further comprising:
   sending a list of available printing devices associated with the enterprise to a user computing device, wherein the list of available printing devices includes the printing device.

4. The method of claim 1, wherein the printing device is a cloud-aware printing device.

5. The method of claim 1, wherein the printing service is provided by a computing cloud.

6. One or more non-transitory computer-readable media storing instructions that, when executed by one or more computing devices, cause the one or more computer devices to perform operations comprising:
   receiving, from a user computing device, a selection of a printing device available on an enterprise, wherein the selection includes a printing device identifier associated with the printing device;
   receiving, from an enterprise device, a credential issued by an enterprise device associated with the enterprise;
   receiving a first credential from the printing device at a registration service;
   receiving a printing service user identifier at the registration service;
   sending the first credential to the printing service from the registration service;
   receiving a second credential from the printing service at the registration service; and
   sending the second credential, the printing device identifier, and the printing service user identifier to the printing service.

7. The one or more non-transitory computer-readable media of claim 6, wherein the operations further comprise:
   receiving an enterprise user identifier and a credential associated with the enterprise user identifier,
   wherein the credential issued by the enterprise device is issued by the enterprise device in response to a verification operation, wherein the verification operation is based on the enterprise user identifier and the credential associated with the enterprise user identifier.

8. The one or more non-transitory computer-readable media of claim 6, wherein the operations further comprise:
   receiving an enterprise user identifier and a request to share a printer on the enterprise; and
   redirecting the enterprise user identifier and the request to share a printer on the enterprise to the enterprise device.

9. The one or more non-transitory computer-readable media of claim 6, wherein the operations further comprise:
   sending a list of available printing devices associated with the enterprise to the user computing device.

10. The one or more non-transitory computer-readable media of claim 6, wherein the operations further comprise:
    polling the printing service for an invitation, associated with the printing service user identifier, to access the printing device via the printing service; and
    sending an acceptance of invitation to the printing service.

11. The one or more non-transitory computer-readable media of claim 6, wherein the first credential is issued by the printing service.

12. A system for registering a printing device, the system comprising:
    an enterprise device associated with an enterprise, wherein the enterprise device is configured to
      receive an enterprise user identifier and a credential associated with the enterprise user identifier,
      generate an enterprise credential, and
      transmit the enterprise credential to a user computing device; and
    a registration device configured to
      receive a printing service user identifier;
      receive a printing device identifier for a printing device associated with the enterprise;
      receive a first credential from the printing device;
      receive the enterprise credential and, in response,
        send the first credential to the printing service,
        receive a second credential from the printing service, and
        transmit the second credential, the printing device identifier, and the printing service user identifier to the printing service.

13. The system of claim 12, wherein the enterprise device is further configured to transmit a list of printing devices associated with the enterprise to the user computing device, wherein the list indicates the printing device.

14. The system of claim 12, wherein the registration device is further configured to
- receive a request to share a printing device, wherein the request to share a printing device indicates the enterprise, and
- transmit the request to share a printing device to the enterprise device.

15. The system of claim 14, wherein the registration device is further configured to
- receive the enterprise user identifier and the credential associated with the enterprise user identifier, and
- transmit the enterprise user identifier and the credential associated with the enterprise user identifier to the enterprise device.

* * * * *